United States Patent [19]

Johnson et al.

[11] Patent Number: 5,035,188

[45] Date of Patent: Jul. 30, 1991

[54] LIQUID BLOWDOWN ELIMINATION SYSTEM

[75] Inventors: Bruce C. Johnson, Broken Arrow, Okla.; James A. Newburn, Knoxville, Tenn.

[73] Assignee: IT-McGill Pollution Control Systems, Inc., Tulsa, Okla.

[21] Appl. No.: 580,773

[22] Filed: Sep. 11, 1990

[51] Int. Cl.5 ............................................. F23J 11/00
[52] U.S. Cl. ................................... 110/345; 110/215; 110/216
[58] Field of Search ...................... 110/345, 215, 216

[56] References Cited

U.S. PATENT DOCUMENTS

| | | | |
|---|---|---|---|
| 3,601,070 | 8/1971 | Lambiris | 110/215 |
| 3,884,162 | 5/1975 | Schuster | 110/215 |
| 3,932,280 | 1/1976 | Anderson | 110/215 |
| 4,223,614 | 9/1980 | Barkhuas et al. | 110/238 |
| 4,245,569 | 1/1981 | Fallon, III | 110/215 |
| 4,520,761 | 6/1985 | Arnold | 110/215 |
| 4,644,877 | 2/1987 | Barton et al. | 110/215 |
| 4,860,671 | 8/1989 | Glorioso | 110/210 |
| 4,949,652 | 8/1990 | Hadley | 110/210 |
| 4,958,578 | 9/1990 | Houser | 110/215 |

Primary Examiner—Henry C. Yuen
Attorney, Agent, or Firm—Bill D. McCarthy

[57] ABSTRACT

An improved process for eliminating the liquid blowdown stream from the wet flue gas scrubbing equipment of an incinerator system. The liquid blowdown stream from the main wet scrubbing system is mixed with a hot flue gas slipstream. The water is evaporated and the residual solids are removed, thereby producing a dry waste stream for disposal and a solids-free flue gas slipstream for exhaust.

24 Claims, 3 Drawing Sheets

LIQUID BLOWDOWN ELIMINATION SYSTEM

BACKGROUND OF THE INVENTION

1. Field of the Invention

The present invention relates generally to elimination or minimization of a liquid blowdown stream from an incinerator system which employs wet flue gas scrubbing equipment, and more particularly, but not by way of limitation, to an incinerator system wherein a flue gas slipstream is employed to evaporate water from a scrubber blowdown stream.

2. Discussion

An incinerator may produce a hot flue gas stream containing particles and toxic metals such as cadmium and mercury which must be removed before the gas can be released to the atmosphere. The hot flue gas stream can also contain sulfur, chlorine and other compounds which are acidic and which also must be removed prior to release of the hot flue gas stream.

The use of a baghouse to remove particulate matter from a hot flue gas stream requires many special features to ensure successful and long term operations. Many of the salts and particles encountered are corrosive, the particles are small in size, and most systems are installed outside. As a result, special coatings, special bags, and extensive insulating and electrical heating devices are often required.

The use of wet scrubbing equipment to remove undesirable gaseous and particulate matter from incinerator flue gas results in a liquid blowdown stream requiring disposal. The liquid blowdown stream typically contains 3% to 15% soluble salt and ash removed from the flue gas. Water treatment facilities, in many cases, are limited in the amount of dissolved salts and suspended solids that can be processed. Deep wells are being closed, thus alternate methods must be found to treat or minimize the blowdown stream from incinerators.

The present invention provides an improved system for eliminating or minimizing liquid blowdown which solves the above mentioned disposal problems related to the liquid blowdown stream, with additional advantages which are described herein for reducing the costs of producing a dry waste with its significantly lower disposal costs.

SUMMARY OF THE INVENTION

The present invention provides an improved system for eliminating or minimizing liquid blowdown from the wet scrubber equipment of an incinerator system. The system for eliminating or minimizing liquid blowdown comprises combining a flue gas slipstream from a main flue gas stream with a liquid blowdown stream to evaporate the liquid from the liquid blowdown stream to produce a dry effluent waste stream and quench the flue gas to a safe temperature for treatment in a baghouse. Residual particulate material (i.e. solids) present in the dry effluent stream are then removed from the dry effluent stream to produce a solids-free flue gas slipstream for exhaust or further treatment in the wet scrubber equipment.

When a baghouse is used to remove residual particulate material from the dry effluent stream, the baghouse does not need to operate continuously and can be bypassed during the cleaning cycle, thus reducing the size of the baghouse. More importantly, the greatly reduced size of the baghouse in the present invention compared to that required for a system which would handle the entire flue gas flow from the incinerator permits the baghouse to be much more cost effective.

An object of the present invention is to provide an improved system for eliminating or minimizing liquid blowdown from scrubbers and the like treating flue gas from an incinerator system, while minimizing capital and operating costs.

Other objects, features and advantages of the present invention will be apparent from the following detailed description when read in conjunction with the drawings and appended claims.

DESCRIPTION

In the following description of the incinerator system of the present invention, various valving and controls are not shown as the selection and appropriate placement of such valves and controls will be within the knowledge and skill of a person skilled in this area of technology.

Figure 1:
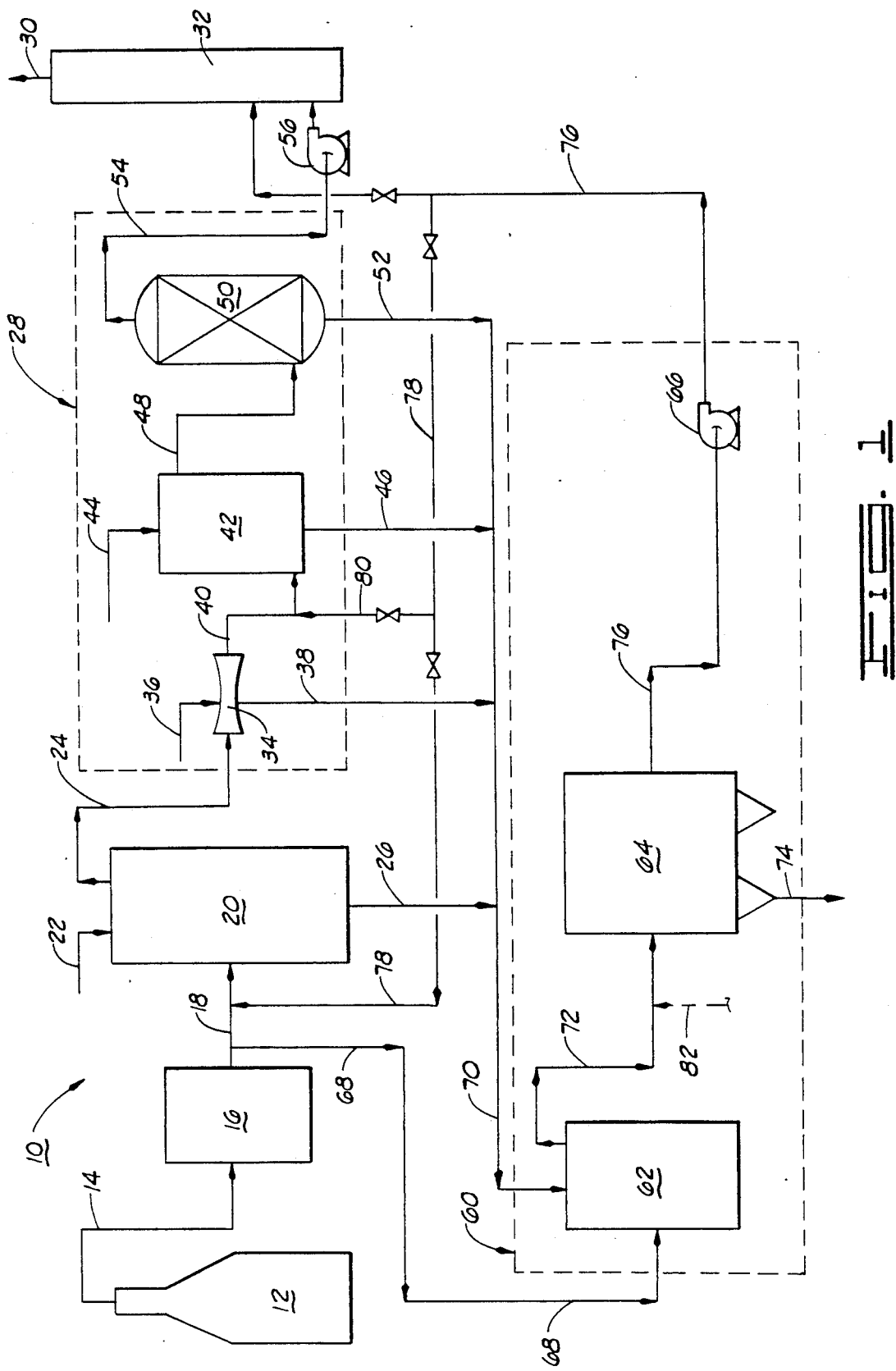
FIG. 1 is a block diagram of an incinerator system in accordance with the present invention.

Referring generally to the drawings and more particularly to FIG. 1, a liquid blowdown elimination or minimization system 10 constructed in accordance with the present invention is diagrammatically illustrated. The system 10 comprises the following components.

12 depicts a conventional primary incinerator in which a solid, liquid or gaseous material is incinerated, and which generates an overhead flue gas stream 14.

16 is a secondary combustion chamber to which the flue gas stream 14 is passed.

18 is a main flue gas stream produced by the secondary combustion chamber 16.

20 is a scrubber or quench vessel in which the main flue gas stream 18 is combined with a scrubber or quench liquid 22 to produce a saturated flue gas stream 24 and a bottom liquid stream 26. If acid gases are present in the main flue gas stream 18, the quench liquid 22 may include alkaline materials which react with and neutralize a portion or all of the acid gases. However, if toxic metals such as cadmium or mercury are present in the main flue gas stream 18, the quench liquid 22 may contain sulfides which react with such toxic metals to form precipitates so that the toxic metals can be removed from the flue gas stream.

The saturated flue gas stream 24 is passed through an air pollution system 28 for treatment so that substantially particulate-free flue gas stream 30 can be exhausted to the atmosphere via a flue gas exhaust stack 32. The air pollution system 28 includes the following components.

A venturi scrubber 34 in which the saturated flue gas stream 24 is combined at high velocity with a scrubber liquid 36. The scrubber liquid 36 is atomized to produce very fine droplets which efficiently combine with particulate matter in the saturated flue gas stream 24. A venturi liquid stream 38 is exhausted from the venturi scrubber 34, and a venturi exhaust flue gas stream 40 flows from the venturi scrubber 34.

While the venturi scrubber 34 has been depicted as a particulate removal device of the air pollution system 28, it is to be understood that the inventive concept disclosed herein is not limited to a venturi scrubber. Thus, other particulate removal devices such as an ionizing wet scrubber, a wet electrostatic precipitator and the like can be utilized as the particulate removal device of the air pollution system 28 of the liquid blowdown elimination or minimization system 10 of the present invention.

The air pollution system 28, in addition to a particulate removal device, such as the venturi scrubber 34, further includes a packed bed scrubber 42 in which any acid gases remaining in the venturi exhaust flue gas stream 40 are absorbed. Entrained water droplets collected in a packed bed scrubber liquid 44 introduced into the packed bed scrubber 42 flow from the packed bed scrubber 42 as a scrubber bottom stream 46.

A scrubbed main flue gas stream 48 exiting the packed bed scrubber 42 is introduced into a mist eliminator 50, also known as an entrainment separator, wherein entrained water droplets in the scrubbed main flue gas stream 48 are collected and discharged as a mist eliminator bottom stream 52. An overhead stream 54 is produced which consists of the substantially particulate-free flue gas stream 30 and thus is suitable for discharge to the atmosphere via the flue gas exhaust stack 32.

A fan 56 is employed to induce a draft through the scrubber or quench vessel 20 and the air pollution control system 28 so that the overhead stream 54 from the mist eliminator 50 can readily be exhausted to the atmosphere through the flue gas exhaust stack 32 as the flue gas stream 30.

The primary incinerator 12, secondary combustion chamber 16, quench vessel 20, particulate removal device (the venturi scrubber 34), packed bed scrubber 42, mist eliminator 50, fan 56 and flue gas exhaust stack 32 are of conventional types commonly found in the industry. Thus, no further explanation of such components is deemed necessary for one skilled in the art to understand the interconnection and operation of such components.

Figure 2:
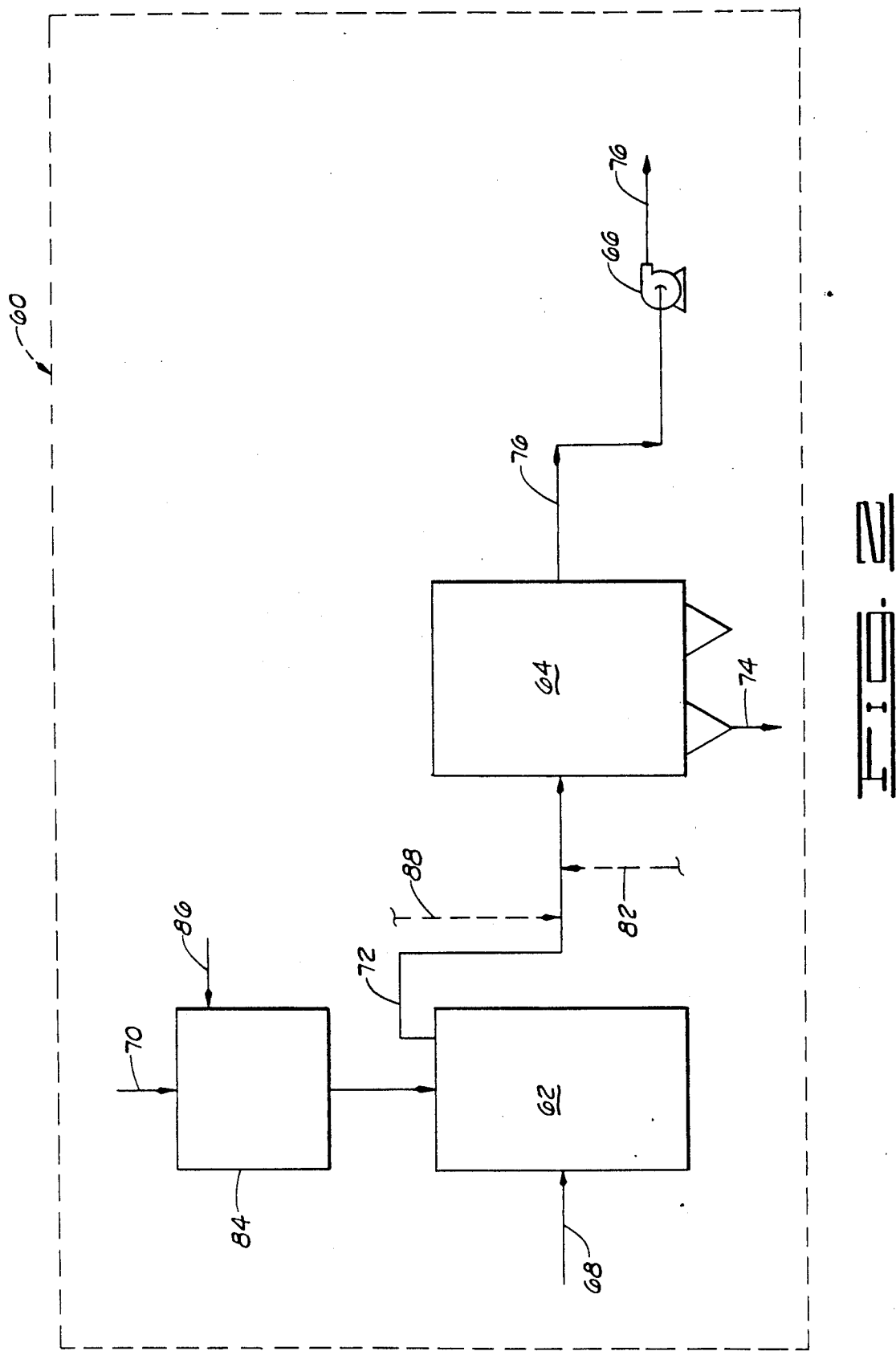
FIG. 2 is a block diagram of a blowdown system of the incinerator system of the present invention wherein an acid gas absorbent is introduced to neutralize acidic gas components present in the flue gas slipstream.

Referring to FIGS. 1 and 2, a blowdown system 60 of the liquid blowdown elimination or minimization system 10 is illustrated. The blowdown system 60 comprises the following components.

62 is a partial quench vessel.
64 is a baghouse with internal filters (not shown).
66 is a fan.
68 is a hot flue gas slipstream constituting a portion of the main flue gas stream 18.
70 is a combined liquid blowdown stream which is the collected bottom liquid stream 26, venturi liquid stream 38, scrubber bottom stream 46 and mist eliminator bottom stream 52. It should be understood that the collected bottom liquid stream 26, the venturi liquid stream 38, the scrubber bottom stream 46 and the mist eliminator bottom stream 52 (either individually or collectively) can be cascaded forward without adversely affecting the liquid blowdown elimination or minimization system 10 of the present invention.

As illustrated in FIG. 1, the combined blowdown stream 70 is passed to the partial quench vessel 62 to be intimately contacted with the hot flue gas slipstream 68. The heat energy present in the hot flue gas slipstream 68 serves to evaporate the combined liquid blowdown stream 70 and produce a dry effluent slipstream 72 which is passed to the baghouse 64.

The baghouse 64 removes particulate material present in the combined blowdown stream 70 and produces a bottom particulate stream 74 and a substantially solids or particulate-free flue gas slipstream 76. The fan 66 induces a draft in the baghouse 64 to assist in the withdrawal of the substantially solids-free flue gas slipstream 76 from the baghouse 64 for passage to the stack 32 where it is mixed with the overhead stream 54 and exhausted to the atmosphere as the particulate-free flue gas stream 30. In some applications the fan 66 can be eliminated if there is sufficient pressure drive in the blowdown system 60 to pas the substantially solids-free flue gas slipstream 76 to the stack 32.

If acid gases are present in the hot flue gas slipstream 68, the substantially solids-free flue gas slipstream 76 can be recycled for admixture with the main flue gas stream 18 via conduit 78 or to the venturi exhaust flue gas stream 40 via the conduit 78 and a conduit 80. Appropriate valving would selectively achieve the desired routing of the substantially solids-free flue gas slipstream 76 as indicated.

If the temperature of the hot flue gas slipstream 68 is too high, for example above about 450° F., it may be desirable to cool the dry effluent slipstream 72 to protect filters in the baghouse 64.

82 depicts an optional air injection stream for injection of relatively cool air into the dry effluent slipstream 72 as required to maintain the temperature of the dry effluent slipstream 72 at or below an acceptable maximum temperature. Cooling of the dry effluent slipstream 72 serves to not only protect the filters of the baghouse 64 from unacceptable high temperatures, but such cooling also lowers the dewpoint of the dry effluent slipstream 72, thus assuring the dryness of the filters.

In many instances the baghouse 64 does not need to be operated at all times, and this permits off stream cleaning, reducing the requirement of the baghouse 64 considerably.

Referring now to FIG. 2, the blowdown system 60 of the liquid blowdown elimination-minimization system 10 is illustrated as further comprising the following components.

84 is a mixer which introduces an acid gas neutralizer stream 86 into the combined liquid blowdown stream 70. The acid gas neutralizer stream 86, typically sodium hydroxide or lime, reacts with and neutralizes acid gases present in the combined liquid blowdown stream 70. If the liquid blowdown stream 70 contains toxic metals, such as cadmium or mercury, sulfides can also be introduced into the mixer 84 to effect precipitation of such toxic metals.

88 depicts an additional acid gas neutralizer stream, again typically sodium hydroxide or lime, which can be introduced into the dry effluent slipstream 72.

When acid gases, toxic metals or combinations thereof are present in the hot flue gas slipstream 68, the introduction of the acid gas neutralizer and/or sulfide stream 86 into the combined liquid blowdown stream 70 or the introduction of the acid gas neutralizer stream 88 into the dry effluent slipstream 72 permits exhaustion of the substantially solids-free flue gas slipstream 76 directly to the stack 32 (see FIG. 1) or to an alternate stack (not shown).

Figure 3:
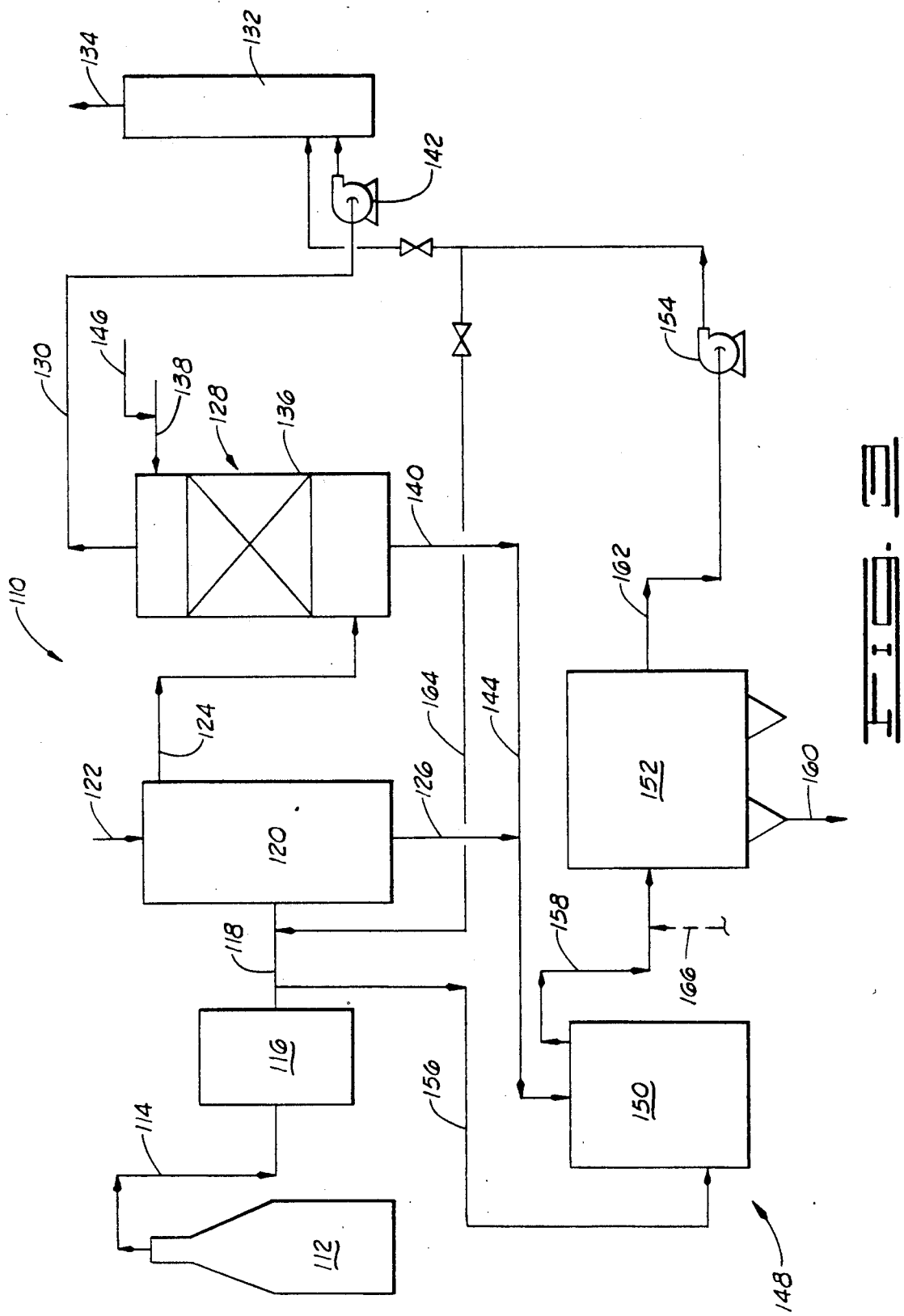
FIG. 3 is a block diagram of an incinerator system for treatment of a particulate-free flue gas from a combustion chamber in accordance with the present invention.

Referring now to FIG. 3, an embodiment of a liquid blowdown elimination or minimization system 110 of the present invention for treatment of substantially particulate-free flue gas is illustrated. As with the description of FIGS. 1 and 2, various valving and control elements are not shown as the selection and appropriate placement of such valves and controls will be within the knowledge and skill of a person of ordinary skill.

The liquid blowdown elimination or minimization system 110 comprises the following components:

112 depicts a conventional primary incinerator in which a particulate-free liquid or gaseous material is incinerated, and which generates a particulate-free overhead flue gas stream 114.

116 is a secondary combustion chamber to which the overhead flue gas stream 114 is passed.

118 is a main flue gas stream produced by the secondary combustion chamber 116.

120 is a scrubber or quench vessel in which the main flue gas stream 118 is combined with a scrubber or quench liquid 122.

If acid gases are present in the main flue gas stream 118, the quench liquid 122 may include alkaline materials which will react with and neutralize the acid gases. A saturated flue gas stream 124 is exhausted from the quench vessel 120, and a bottom liquid stream 126 is produced.

The saturated flue gas stream 124 is then passed through an air pollution system 128 so that a flue gas overhead stream 130 produced by the air pollution system 128 can be exhausted to the atmosphere via a flue gas exhaust stack 132 as a particulate-free, acid-free flue gas stream 134. The air pollution system 128 comprises a packed bed scrubber 136 in which any acid gases remaining in the saturated flue gas stream 124 are absorbed. Scrubber liquid 138 introduced into the packed bed scrubber 136 flows from the packed bed scrubber 136 as a scrubber bottom stream 140.

A fan 142 is employed to induce a draft through the scrubber or quench vessel 120 and the packed bed scrubber 136 so that the flue gas overhead stream 130 from the packed bed scrubber 136 can readily be exhausted to the atmosphere through the flue gas exhaust stack 132 as the particulate-free, acid-free flue gas stream 134.

In order to provide a neutralized combined liquid blowdown stream 144 comprising the combined bottom liquid stream 126 and the scrubber bottom stream 140, as well as to insure that all acid gases present in the saturated flue gas stream 124 have been neutralized, an acid gas neutralizer is introduced into the scrubber liquid 138 via stream 146.

The liquid blowdown elimination or minimization system 110 further comprises a blowdown system 148. The blowdown system 148 comprises, in addition to the neutralized combined liquid blowdown stream 144, the following components.

150 is a partial quench vessel.

152 is a baghouse with internal filters (not shown).

154 is a fan.

156 is a hot flue gas slipstream constituting a portion of the main flue gas stream 118.

The neutralized combined liquid blowdown stream 144 is passed to the partial quench vessel 150 to be intimately contacted with the hot flue gas slipstream 156. The heat energy present in the hot flue gas slipstream 156 serves to evaporate the neutralized combined liquid blowdown stream 144 and produce a dry effluent slipstream 158 which is passed to the baghouse 152.

The baghouse 152 removes particulate material present in the dry effluent slipstream 158 and produces a bottom particulate stream 160 (i.e., salts resulting from the neutralization of acid gases) and an effluent flue gas slipstream 162. The fan 154 induces a draft in the baghouse 152 to assist in the withdrawal of the effluent flue gas slipstream 162 from the baghouse 152 for passage to the flue gas exhaust stack 132 where it is mixed with the flue gas overhead stream 130 and exhausted to the atmosphere as the particulate-free, acid-free flue gas stream 134. In some applications the fan 154 can be eliminated if there is sufficient pressure drive in the blowdown system 110 to pass the effluent flue gas slipstream 162 to the flue gas exhaust stack 132.

If acid gases are detected as being present in the effluent flue gas slipstream 162, the effluent flue gas slipstream 162 can be recycled for admixture with the main flue gas stream 118 via conduit 164. Appropriate valving would selectively achieve the desire routing of the effluent flue gas slipstream 162 as indicated.

If the temperature of the dry effluent slipstream 158 is too high, for example above about 450° F, it may be desirable to cool the dry effluent slipstream 158 to protect filters in the baghouse 152.

166 depicts an air injection stream for injection of relatively cool air into the dry effluent slipstream 158 as required to maintain the temperature of such stream at or below an acceptable maximum temperature. Cooling of the dry effluent slipstream 158 serves to not only protect the filters of the baghouse 152 from unacceptable high temperatures, but such cooling also lowers the dewpoint of the dry effluent slipstream 158, thus assuring the dryness of the filters.

In many instances the baghouse 152 does not need to be operated at all times, and this permits off stream cleaning, reducing the requirement of the baghouse 152 considerably.

The liquid blowdown elimination or minimization system described herein efficiently combines the advantages of wet scrubbing equipment and baghouses. The heat energy in the hot flue gas slipstream is utilized to evaporate the quench liquid in the liquid blowdown stream and produce an effluent waste slipstream. Since the effluent waste stream is small compared to the main flue gas stream, the baghouse or other means for removing residual solids from the dry effluent waste stream can also be small and, therefore, cost effective. The liquid blowdown stream produced by wet scrubbing equipment is eliminated and replaced by a dry effluent waste stream whose volume is significantly reduced and whose disposal is frequently more environmentally acceptable. Further, the overall particulate material present in the flue gas discharged to the atmosphere is substantially reduced as compared to the particulate content of flue gas using particulate removal devices, such as a venturi scrubber.

It will be clear that the present invention is well adapted to carry out the objects and attain the advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims.

What is claimed is:

1. In an incinerator system in which a flue gas stream is subjected to a wet scrubber system or the like to recover particulate matter and/or acid gases contained in a main flue gas stream and in which is produced a liquid bottom stream and an exhaust overhead flue gas stream, the improvement comprising the steps of:

(a) removing a flue gas slipstream from the main flue gas stream;

(b) combining the flue gas slipstream with a liquid blowdown stream to evaporate the liquid constituent of the liquid blowdown stream and produce a dry effluent slipstream;

(c) removing residual particulates from the dry effluent slipstream to produce a substantially solids-free flue gas slipstream; and (d) exhausting the substantially solids-free flue gas slipstream.

2. In an incinerator system of claim 1 wherein exhausting of the substantially solids-free flue gas slipstream comprises recombining the substantially solids-free flue gas slipstream with the main flue gas stream at a location immediately downstream from removal of the flue gas slipstream from the main flue gas stream.

3. In an incinerator system of claim 1 wherein exhausting of the substantially solids-free flue gas slipstream comprises recombining the substantially solids-free flue gas slipstream with the main flue gas stream following passage thereof from the wet scrubber system.

4. In an incinerator system of claim 1 wherein exhausting of the substantially solids-free flue gas slipstream comprises recombining the substantially solids-free flue gas slipstream with the scrubbed main flue gas stream.

5. In an incinerator system of claim 1 wherein the improvement further comprises the step of injecting a cooler gas into the dry effluent slipstream as required to maintain the temperature of the dry effluent slipstream at less than about 450° F.

6. In an incinerator system of claim 1 wherein the main flue gas stream contains acid gases, and wherein the improvement further comprises the step of introducing an acid gas neutralizer into the dry effluent slipstream to react with and neutralize such acid gases.

7. In an incinerator system of claim 1 wherein the main flue gas contains acid gases and wherein the improvement further comprises the step of mixing an acid gas neutralizer with the liquid blowdown stream prior to combining the flue gas slipstream with the liquid blowdown stream in accordance with step (b).

8. In an incinerator system of claim 1 wherein removing residual particulates from the dry effluent stream in accordance with step (c) is carried out by collecting the residual particulates in a baghouse.

9. In an incinerator system of claim 1 wherein removing of the flue gas slipstream from the main flue gas stream in accordance with step (a) and exhausting of the flue gas slipstream in accordance with step (d) are carried out by passing the flue gas slipstream from the point of removal of the flue gas slipstream from the main flue gas stream to the point of exhaust of the substantially solids-free flue gas slipstream.

10. In an incinerator system of claim 9 wherein the improvement further comprises the step of mixing an acid gas neutralizer with the liquid blowdown stream prior to combining the flue gas slipstream with the liquid blowdown stream in accordance with step (b).

11. In an incinerator system of claim 9 wherein the main flue gas stream contains acid gases, and wherein the improvement further comprises the step of mixing the acid gas neutralizer with the dry effluent stream produced in accordance with step (b) prior to removing the residual particulates from the dry effluent stream in accordance with step (c).

12. In an incinerator system of claim 1 wherein the main flue gas stream contains particulate matter characterized as toxic metals and wherein the improvement further comprises introducing a chemical component into the dry effluent slipstream to react with and thereby precipitate such toxic metals.

13. In an incinerator system of claim 1 wherein the flue gas stream contains particulate matter characterized as toxic metals and wherein the improvement further comprises the step of mixing a chemical component with the liquid blowdown stream to react with the toxic metals and form a precipitate prior to combining the flue gas slipstream with the liquid blowdown stream in accordance with step (b).

14. In an incinerator system wherein a quench liquid is combined with a main flue gas stream in a scrubber operation to recover solids contained in the main flue gas stream and in which a liquid blowdown stream and an exhaust overhead flue gas stream are produced, the improvement comprising a system for eliminating or minimizing the liquid blowdown stream which comprises:

means for removing a flue gas slipstream from the main flue gas stream;

means for combining the flue gas slipstream with the liquid blowdown stream to evaporate the scrubber liquid from the liquid blowdown stream and thereby produce a dry effluent slipstream;

means for removing residual particulates from the dry effluent stream to produce a substantially solids-free flue gas slipstream; and means for exhausting the substantially solids-free flue gas slipstream.

15. In an incinerator system of claim 14 wherein the means for removing the flue gas slipstream from the main flue gas stream comprises a fan communicating with the flue gas slipstream.

16. In an incinerator system of claim 14 wherein the means for removing the flue gas slipstream diverts a portion of the main flue gas stream as a flue gas slipstream.

17. In an incinerator system of claim 14 wherein the means for removing the dry particulates from said dry effluent waste stream comprises a baghouse.

18. In an incinerator system of claim 17 wherein the improvement further comprises means for injecting air into the dry effluent stream as required to maintain the dry effluent stream at a temperature of less than about 450° F.

19. In an incinerator system of claim 14 wherein the improvement further comprises means for introducing into the flue gas slipstream an acid gas neutralizer to react with and neutralize acid gases present in the flue gas.

20. In an incinerator system of claim 14 wherein the improvement further comprises a mixer for mixing the acid gas neutralizer with the liquid blowdown stream.

21. In an incinerator system of claim 14 wherein the improvement further comprises means for introducing a dry acid gas neutralizer into the dry effluent slipstream upstream of the means for removing the residual particulates from the dry effluent slipstream.

22. In an incinerator system in which a main flue gas stream contains particulates or acid gases, the improvement adapted to eliminate or minimize liquid blowdown and comprising the steps of:
  (a) removing a flue gas slipstream from the main flue gas stream;
  (b) scrubbing the remaining flue gas with a quench liquid to produce a liquid bottom stream having a liquid blowdown stream and an exhaust overhead flue gas stream;
  (c) combining the flue gas slipstream with the liquid blowdown stream to evaporate the liquid from the liquid blowdown stream to produce a dry effluent slipstream;
  (d) removing residual particulates from the dry effluent slip stream to produce a substantially solids-free flue gas slipstream; and
  (e) exhausting the substantially solids-free flue gas slipstream.

23. In an incinerator system of claim 22 wherein the improvement further comprises the step of introducing an acid gas neutralizer into the flue gas slipstream to react with and neutralize said acid gases.

24. In an incinerator system of claim 22 wherein the particulates in the main flue gas stream include toxic metals and wherein the improvement further comprises the step of introducing a chemical component into the flue gas slipstream to react with and precipitate the toxic metals.

* * * * *